Dec. 5, 1933.   M. PIER ET AL   1,937,588
DESTRUCTIVE HYDROGENATION OF CARBONACEOUS MATERIALS
Original Filed Sept. 9, 1929   2 Sheets-Sheet 1
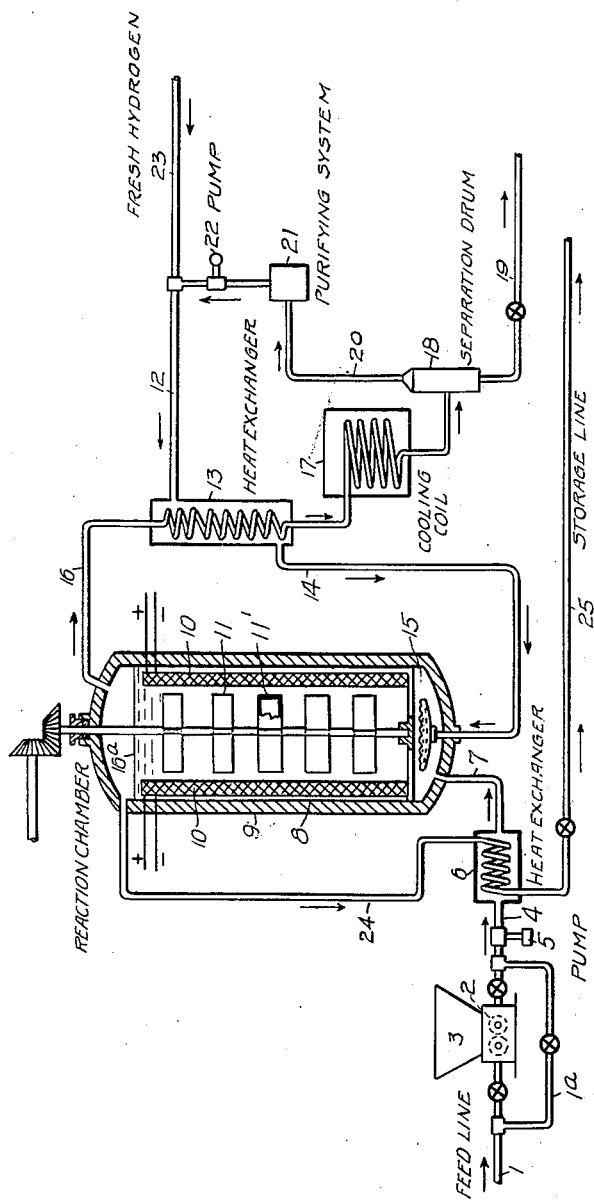
MATHIAS PIER
WALTER SIMON
INVENTORS Dec. 5, 1933.  M. PIER ET AL  1,937,588
DESTRUCTIVE HYDROGENATION OF CARBONACEOUS MATERIALS
Original Filed Sept. 9, 1929    2 Sheets-Sheet 2
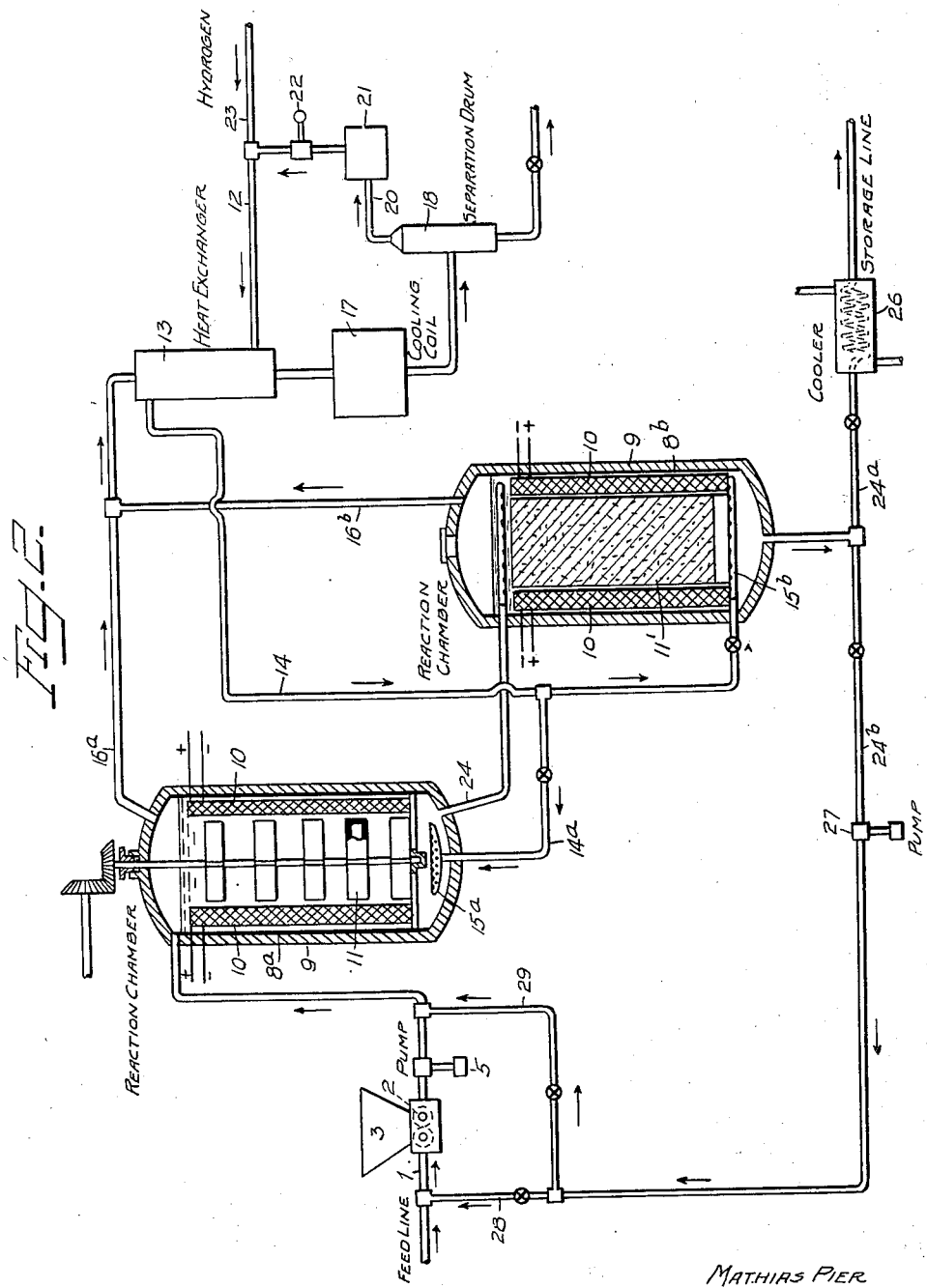
MATHIAS PIER
WALTER SIMON
INVENTORS Patented Dec. 5, 1933

1,937,588

UNITED STATES PATENT OFFICE 1,937,588

DESTRUCTIVE HYDROGENATION OF CARBONACEOUS MATERIALS

Mathias Pier, Heidelberg, and Walter Simon, Ludwigshafen-on-the-Rhine, Germany, assignors to Standard-I. G. Company, Linden, N. J., a corporation of Delaware Original application September 9, 1929, Serial No. 391,509, and in Germany September 24, 1928. Divided and this application December 24, 1930. Serial No. 504,590

5 Claims. (Cl. 196—53)

This is a divisional application relating to subject matter divided out from our copending application Serial No. 391,509, filed 9th September 1929.

This invention relates to improvements in the manufacture and production of valuable liquid hyrocarbons, which expression also includes hydrocarbon derivatives by destructive hydrogenation of distillable carbonaceous materials. By destructive hydrogenation is meant a conversion effected with an excess of hydrogen at a temperature of from 300 to 700° C. and a pressure of at least 20 atmospheres.

We have found that the manufacture and production of valuable liquid hydrocarbons and/or hydrocarbon derivatives from distillable carbonaceous materials, such as the various kinds of coal, tars, mineral oils and other bituminous materials, or their distillation or conversion products by destructive hydrogenation, can be carried out in a particularly advantageous manner by employing catalysts, which comprise at least three different constituents, one being metallic aluminum, alumina or an aluminous clay, and the other two being oxides or hydroxides of different metals of the sixth group of the periodic system. Said oxides or hydroxides of the sixth group metals have an activating action upon each other.

In accordance with the present invention, for example, a catalyst which contains two oxides or hydroxides of different metals of the sixth group of the periodic system and or of metals of the 5th and 6th group of the periodic system and the activity of which is dependent on the nature of the crude materials employed in its manufacture can be considerably improved by the addition of the further constituent hereinbefore specified. For example, catalysts containing oxides or hydroxides of molybdenum and chromium, which are frequently very active, are only comparatively slightly active when employing for their preparation certain molybdic acids, such as molybdic acid hydrate. By incorporating kaolin into such a comparatively slightly active catalyst containing molybdic acid and chromium the injurious influence of the inferior molybdic acid is almost completely compensated for and a catalyst is obtained, the activity of which is very much enhanced. The further aluminum containing constituent may also contribute to the improvement of the catalyst in other respects, for example, it may serve to increase the mechanical stability. The catalysts in accordance with the present invention can be employed for the treatment of initial materials in the liquid state as well as in the vaporous state. As suitable combinations for catalysts may be mentioned among others, molybdic acid, chromium trioxide and kaolin.

Examples of catalysts in accordance with the present invention are those which contain molybdenum trioxide, zinc sulphide and chromic acid in combination with aluminum containing additions, for example, kaolin, or catalysts containing in the combination specified at least two oxides, hydroxides or sulphides of different metals from the class consisting of tungsten, molybdenum, uranium, and chromium. Very suitable catalysts are, for example, those prepared from molybdenum trioxide, chromium oxide and zinc oxide or sulphide, with an addition thereto of kaolin. As typical examples of mixtures for the preparation of such catalysts may be mentioned, a mixture comprising 234 parts of molybdenum trioxide, 81 parts of zinc oxide, 20 parts of chromium oxide and 30 parts of kaolin, or 234 parts of molybdenum trioxide, 97 parts of zinc sulphide, 20 parts of chromium oxide, and 20 parts of kaolin. Further typical examples of mixtures for the preparation of catalysts which may be employed for the process according to the present invention, are, for example, such consisting of 80 to 90 parts of molybdenum trioxide, 10 parts of chromium oxide, 20 parts of roasted pyrites or diatomaceous earth and 0.6 part of aluminium. Further excellent results are obtained with catalysts consisting of 90 parts of tungsten oxide, 10 parts of chromium oxide, 20 parts of kaolin and 0.6 part of aluminium or with a catalyst consisting of 90 parts of molybdenum trioxide, 10 parts of chromium oxide and 20 parts of Florida earth. It should be understood that the proportions hereinbefore stated are given merely by way of example and are capable of very wide variations and the scope of the invention is not limited to the proportions given.

In the accompanying drawings, apparatus for carrying out the process in accordance with the present invention are illustrated diagrammatically, partly in vertical section. Our invention is not limited to the apparatus illustrated therein, however, but may be varied at will in accordance with the conditions of working.

Referring to the drawings in Fig. 1 in detail, reference numeral 1 indicates a feed line from any convenient source of liquid raw material. The line 1 discharges to a grinding mechanism 2 fitted with a hopper 3 through which solid materials may be admitted. If desired, the grinding mechanism can be by-passed by line 1a when no solid materials are used. The suspension of solid material in liquid or the liquid alone may be then forced by pump 5 through a line 4 to a heat exchanger 6 and thence by line 7 into a reaction chamber 8. The reaction chamber is constructed in any preferred manner and should be adapted to withstand high pressures, for example, above 20 to 100 or even as high as 800 atmospheres, as well as the corrosive effects of the reactants. The vessel is preferably protected from loss of heat by a suitable insulating cover 9 and may be heated by electric coils 10 which are arranged within the drum. The contents of the drum are preferably kept in a state of agitation by means of a stirring mechanism 11 and suitable catalytic materials 11' as indicated above are attached to the stirring mechanism so that the catalyst is brought into intimate contact with the contents of the vessel.

Hydrogen under high pressure is forced through a line 12, heat exchanger 13 and then by line 14 into the base of the reactor 8 into which it is preferably discharged through a spray pipe 15. A liquid level may be maintained in the drum, for example at the point 16a and gas and vaporous products may be continuously withdrawn by vapor line 16 which is in communication with exchanger 13 and a cooling coil or condenser 17. The condensate and gas is discharged into a separation drum 18 from which the distillate is removed by line 19 to storage, not shown. The gas may be taken off by a pipe 20 to a purifying system indicated at 21, and which may comprise a scrubbing system preferably operated at high pressure using, for example, soda to remove hydrogen sulphide and oil to remove hydrocarbon constituents from the gas. Purified gas is then recompressed by a booster pump 22 and is forced again into the hydrogen feed line 12. Fresh hydrogen may be introduced by line 23. If desired, oil may be continuously removed from the drum by a line 24 which communicates with heat exchanger 6 and which is withdrawn to storage, not shown, by a suitable line 25.

Referring now to the drawings in Fig. 2 a suitable system is shown for converting solid materials into light liquid oils by two steps. Where possible, the same numeral has been used in Fig. 2 as has already been indicated in Fig. 1. Hydrocarbon oil is withdrawn from any suitable storage, not shown, by a line 1 and may be forced through a grinding mechanism 2 which is fitted with the hopper 3 for the introduction of solid material, such as coal, lignite or the like. The pump 5 forces this mixture through line 4 into the first oven indicated by the numeral 8a. This oven may be constructed in the same manner as the oven 8 shown in Fig. 1 and similar parts are designated by the same numerals. A heavy liquefied material is withdrawn from the base of the oven 8a and may be continuously discharged into the second oven indicated by 8b. This oven is packed with a catalytic material in accordance with the present invention indicated at 11' and with the exception that no stirring mechanism is used it may be constructed similarly to oven 8a.

Hydrogen is forced under high pressure from the line 12, as before, through a heat exchanger 13 and by line 14 and branches 14a and 14b into oven 8a and 8b respectively. Vaporous products and gas are removed from both ovens by vapor line 16a and 16b respectively which may discharge through a single exchanger 13 to condenser 17. The light oils are separated from the gases in the separator 18 from which the oil is removed by 19 and the gases may be removed, purified and recompressed as indicated in Fig. 1. Heavy oil may be continuously withdrawn from the oven 8b and a part or the whole thereof may be continuously discharged through a line 24a, cooler 26 and conducted by line 25 to any suitable storage. If desired, a part of this oil may be re-circulated to line 1 or to line 4 by means of recirculation line 24b, pump 27 and either of the two lines 28 or 29, as is desired.

In the operation of this system solid carbonaceous material containing ash may be continuously fed to the first oven and a sufficient quantity of the oil containing inorganic material may be led from the system by the lines 24a and 25 so as to prevent accumulation within the system. Fresh hydrocarbon oil may be continuously fed in sufficient quantity to carry in the solid material or if desired, a part of the oil withdrawn from the second oven, either containing ash or from which the ash has been removed by filtration, settling centrifugal means or the like may be recirculated for the purpose of bringing in the fresh solid material.

The following example will further illustrate the nature of this invention but the invention is not restricted to this example.

*Example*

By passing hydrogen which contains about 2 per cent by volume of a vaporous gas oil, consisting of aliphatic hydrocarbons, at about 460° C. and at a pressure of about 200 atmospheres over a catalyst prepared from 90 parts of molybdic acid, 10 parts of chromic acid and 20 parts of kaolin, a product separates from the gas leaving the reaction chamber by cooling, of which more than 90 per cent consists of benzines which boil up to 180° C. The efficiency of the catalyst in this case is considerably higher than when a catalyst containing only molybdenum and chromium is employed. Moreover, the mechanical strength of the catalyst is considerably improved by the addition of kaolin.

What we claim is:—

1. A process for the production of valuable liquid hydrocarbons from distillable carbonaceous materials which comprises subjecting the said materials to destructive hydrogenation at a temperature and pressure suitable for the conversion and in the presence of a catalyst which comprises at least three different constituents, one being selected from the class consisting of metallic aluminum, alumina and aluminous clays, another being selected from the class consisting of the oxides and hydroxides of a metal of group 6 of the periodic system and a third from the oxides and hydroxides of a different metal of group 6 of the periodic system.

2. A process for the production of valuable liquid hydrocarbons from a distillable carbonaceous material which comprises subjecting said material to destructive hydrogenation with hydrogen at a temperature and pressure suitable for the conversion in the presence of a catalyst which comprises tungsten oxide, chromium oxide, kaolin and aluminum.

3. A process for the production of valuable liquid hydrocarbons from a distillable carbonaceous material which comprises subjecting said material to destructive hydrogenation with hydrogen at a temperature and pressure suitable for the conversion in the presence of a catalyst comprising molybdenum trioxide, chromium oxide and Florida earth.

4. A process for the production of valuable liquid hydrocarbons from a distillable carbonaceous material, which comprises subjecting the said material to destructive hydrogenation with hydrogen at a temperature and pressure suitable for the conversion in the presence of a catalyst which comprises molybdic acid, chromic acid and kaolin.

5. A process for the production of valuable liquid hydrocarbons, which comprises passing a mixture of hydrogen and vaporized gas oil at about 460° C. and under a pressure of about 200 atmospheres over a catalyst comprising molybdic acid, chromic acid and kaolin.

MATHIAS PIER.
WALTER SIMON.